US008849568B2

(12) United States Patent
Mo et al.

(10) Patent No.: US 8,849,568 B2
(45) Date of Patent: Sep. 30, 2014

(54) PORTABLE TERMINAL AND METHOD FOR PROVIDING NETWORK CONTENTS USING A PORTABLE TERMINAL

(75) Inventors: Soon Hee Mo, Seoul (KR); Seung Hee Kim, Seoul (KR)

(73) Assignee: LG Electronics Inc., Seoul (KR)

(*) Notice: Subject to any disclaimer, the term of this patent is extended or adjusted under 35 U.S.C. 154(b) by 1184 days.

(21) Appl. No.: 12/344,109

(22) Filed: Dec. 24, 2008

(65) Prior Publication Data

US 2009/0177376 A1 Jul. 9, 2009

(30) Foreign Application Priority Data

Jan. 4, 2008 (KR) ........................ 10-2008-0001370

(51) Int. Cl.
G08G 1/123 (2006.01)
G01C 21/20 (2006.01)
G01C 21/36 (2006.01)
H04W 4/02 (2009.01)
H04M 1/725 (2006.01)

(52) U.S. Cl.
CPC ................ G01C 21/20 (2013.01); G01C 21/36 (2013.01); H04M 2250/10 (2013.01); H04W 4/026 (2013.01); H04M 1/72558 (2013.01); H04M 1/72572 (2013.01)
USPC ......................... 701/465; 701/439

(58) Field of Classification Search
CPC ....... H04W 4/02; H04W 4/021; H04W 4/028; H04W 64/00; H04W 4/025; H04W 4/18; H04W 12/12; H04W 4/023; H04W 12/08; H04W 4/027; H04W 4/20; H04W 4/206; H04W 64/006; H04W 8/245; H04W 24/00
USPC ........... 701/36, 201, 211, 400, 464, 431, 441, 701/465, 439; 455/412, 556.1, 456.1, 455/456.3, 457; 725/88, 87; 340/989, 994, 340/990
See application file for complete search history.

(56) References Cited

U.S. PATENT DOCUMENTS

| | | | |
|---|---|---|---|
| 6,243,645 B1 * | 6/2001 | Moteki et al. ................. | 701/211 |
| 6,600,982 B1 * | 7/2003 | Cragun ........................... | 701/36 |
| 2002/0045438 A1 * | 4/2002 | Tagawa et al. ................. | 455/412 |
| 2002/0056123 A1 * | 5/2002 | Liwerant et al. ............... | 725/87 |
| 2002/0188390 A1 * | 12/2002 | Ichihara et al. ................ | 701/36 |
| 2003/0078919 A1 * | 4/2003 | Suzuki et al. .................... | 707/3 |
| 2004/0024522 A1 * | 2/2004 | Walker et al. ................. | 701/210 |
| 2004/0078813 A1 | 4/2004 | Kobuya et al. | |
| 2006/0116965 A1 | 6/2006 | Kudo et al. | |
| 2006/0156355 A1 * | 7/2006 | Kawasaki et al. .............. | 725/88 |
| 2008/0250095 A1 * | 10/2008 | Mizuno ......................... | 709/201 |
| 2010/0262674 A1 * | 10/2010 | Tanaka et al. ................. | 709/217 |
| 2011/0077049 A1 * | 3/2011 | Tagawa et al. .............. | 455/556.1 |

FOREIGN PATENT DOCUMENTS

| | | |
|---|---|---|
| EP | 1267314 | 12/2002 |
| JP | 2003-187383 | 7/2003 |
| JP | 2005-340901 | 12/2005 |
| KR | 10-2006-0095627 | 9/2006 |

* cited by examiner

*Primary Examiner* — Lena Najarian
*Assistant Examiner* — Natalie A Pass
(74) *Attorney, Agent, or Firm* — Lee, Hong, Degerman, Kang & Waimey

(57) ABSTRACT

A portable terminal and a method for providing network contents using the portable terminal are provided. The portable terminal receives contents from a network, uses information related to a destination and a pre-stored map data to search for a travel route from a start point to the destination, determines an estimated time for a user to reach the destination from the start point, and outputs travel guide information to guide the user along the travel route while outputting contents having a reproduction time corresponding to the estimated time.

18 Claims, 12 Drawing Sheets

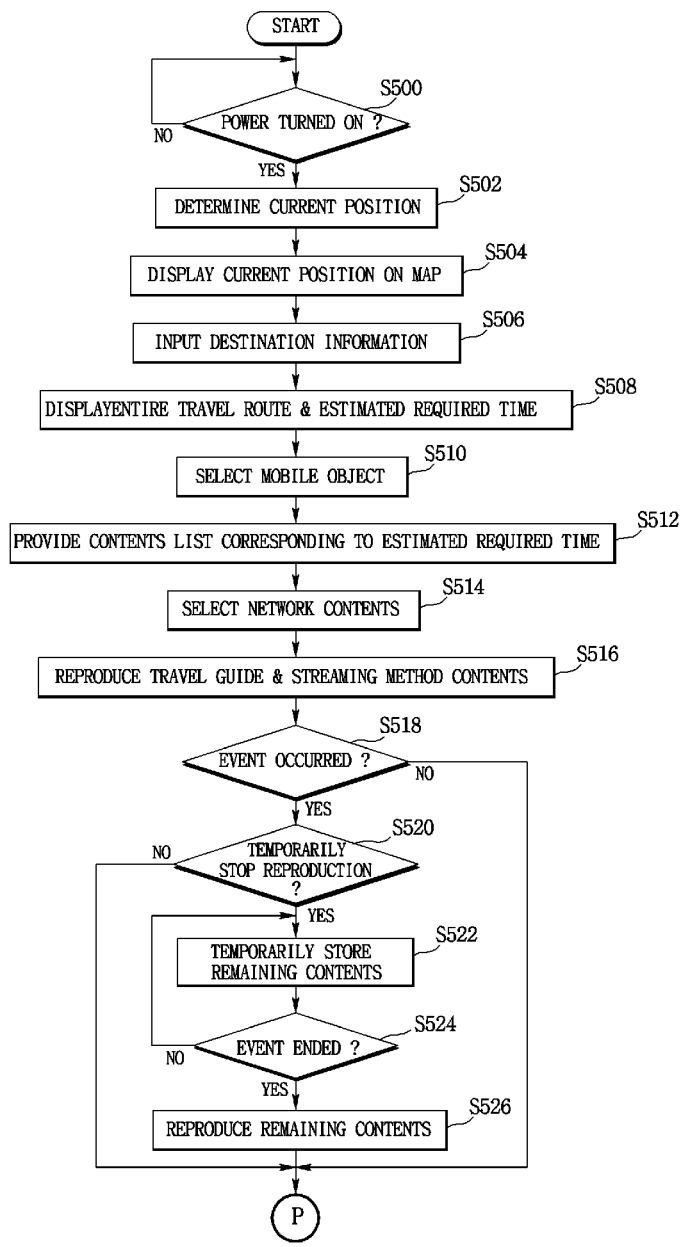

FIG. 11

| PLEASE HAVE A GOOD TIME UNTIL YOU REACH DESTINATION PLEASE SELECT DESIRED MUSIC [ ESTIMATED REQUIRED ARRIVAL TIME: 5 MINUTES ] | | | |
|---|---|---|---|
| NUMBER | SONG | SINGER | REPRODUCTION TIME |
| 1 | FIRST MUSIC CONTENTS | AAA | 4 MINUTES 41 SECONDS |
| 2 | SECOND MUSIC CONTENTS | BBB | 5 MINUTES 6 SECONDS |
| 3 | THIRD MUSIC CONTENTS | CCC | 4 MINUTES 47 SECONDS |
| ⋮ | ⋮ | ⋮ | ⋮ |

FIG. 12

| PLEASE HAVE A GOOD TIME UNTIL YOU REACH DESTINATION PLEASE SELECT DESIRED MUSIC [ ESTIMATED REQUIRED ARRIVAL TIME: 56 MINUTES ] | | |
|---|---|---|
| NUMBER | BROADCASTING | REPRODUCTION TIME |
| 1 | FIRST BROADCAST CONTENTS | 60 MINUTES |
| 2 | SECOND BROADCAST CONTENTS | 55 MINUTES |
| 3 | THIRD BROADCAST CONTENTS ( 30 MINUTES) +MUSIC CONTENTS (25 MINUTES) | 55 MINUTES |
| ⋮ | ⋮ | ⋮ |

PORTABLE TERMINAL AND METHOD FOR PROVIDING NETWORK CONTENTS USING A PORTABLE TERMINAL

CROSS-REFERENCE TO RELATED APPLICATIONS

Pursuant to 35 U.S.C. §119(a), this application claims the benefit of earlier filing date and right of priority to Korean Application No. 10-2008-0001370, filed Jan. 4, 2008, the contents of which is incorporated by reference herein in its entirety.

FIELD OF THE INVENTION

The present invention is directed to a portable terminal, and more particularly to a portable terminal and a method for providing network contents using a portable terminal capable of reproducing multimedia contents.

DESCRIPTION OF THE RELATED ART

A portable terminal is typically a mobile device that performs one or more functions, such as voice and video call communication, data input/output and data storage. With such diverse requirements, portable terminals are evolving into comprehensive multimedia devices that can support various operations, such as capturing images or videos, reproducing music or video files, allowing the user to play games and receiving broadcast contents.

Hardware and/or software implementations are being developed in order to implement complex functions. For example, a user interface that allows the user to search for and select various functions is provided. Portable terminals are also considered an individual's personal belonging for expressing individual personal characters and, therefore, require various designs.

Furthermore, navigational functions using a portable terminal have recently become popular due to abrupt changes in road environments and traffic congestion. The navigational function defines positioning techniques known as GPS (global positioning systems) in which a current position of a mobile object is detected by using navigation messages transmitted by a plurality of GPS satellites.

A current position is detected using a GPS system and the current position is matched to map data and displayed on a display screen of a display unit together with a map. This enables a user to move the mobile object from a start position to a destination using the map data to guide the mobile object along the detected travel route. The user may use the portable terminal to listen to or watch various multimedia contents while the mobile object is moved according to the navigational function of the portable terminal.

However, the amount of contents that may be stored in advance is limited by memory capacity in the portable terminal. Therefore, a user must frequently download movies or music from the Internet to an external storage medium, such as a Universal Serial Bus or a memory card, and re-store the contents in the portable terminal. Consequently, the user cannot instantly view movies or listen to music when the mobile object is moving.

Another disadvantage is that a user may not use content still being reproduced when the user reaches a destination. This disadvantage may decrease a user's desire to purchase multimedia contents if it is expected that the reproduction time of the contents may exceed the arrival time.

SUMMARY OF THE INVENTION

In one aspect of the present invention, a portable terminal for reproducing multimedia contents is provided. The terminal includes a wireless communication unit receiving multimedia contents from a network and a controller processing information related to a destination input by a user and pre-stored map data to search for a travel route from a start point to the destination, determining an estimated time for the user to reach the destination from the start point and outputting travel guide information for guiding the user along the travel route while outputting a first of the multimedia contents having a reproduction time corresponding to the estimated time.

It is contemplated that the terminal further includes a display for visually displaying information and wherein the controller further controls the display to display a menu for selecting the first of the contents for reproduction. It is further contemplated that the controller further controls the display to display the first contents in PIP (Picture-In-Picture) format or by using a divided screen while the travel guide information is being output.

It is contemplated that the controller further controls the display to display a list of the contents related to the first of the contents when the portable terminal is re-connected to the network after completion of outputting the first of the contents. It is further contemplated that the controller further temporarily stores a portion of the first of the contents upon the occurrence of a predetermined event while the first of the contents are being output and outputs the stored portion after the predetermined event ends.

It is contemplated that the controller further determines a remaining time for the user to reach the destination from a current position upon a request for contents change while outputting the first of the contents and outputs a second of the contents having a reproduction time corresponding to the remaining time. It is further contemplated that the controller further determines an additional time for the user to reach the destination from a current position if the user does not reach the destination within the estimated time and outputs a second of the contents having a reproduction time corresponding to the additional time required.

It is contemplated that the controller further stops outputting the first of the contents if the user reaches the destination in less than the estimated time. It is further contemplated that the controller further outputs the first of the contents at a later time from a position where outputting the first of the contents was stopped.

It is contemplated that the controller outputs a portion of the travel guide information using either sound or vibration while the first of the contents are being output. It is further contemplated that the controller further divides an entire travel route into a plurality of sections, determines an estimated time for the user to travel each of the plurality of sections and outputs network contents for each of the plurality of sections, the contents for each of the plurality of sections having a reproduction time corresponding to the estimated time for that section.

In another aspect of the present invention, a method for providing network contents using a portable terminal is provided. The method includes receiving information related to a destination, using pre-stored map data to search for a travel route from a start point to the destination, determining an estimated time for a user to reach the destination from the start point, receiving contents from a network and outputting travel guide information for guiding a user along the travel route while outputting a first of the contents having a reproduction time corresponding to the estimated time.

It is contemplated that the method further includes displaying a menu for selecting the first of the contents for production. It is further contemplated that the method further includes temporarily storing a portion of the first of the contents upon detecting a predetermined event while outputting the first of the contents and outputting the stored portion after the predetermined event ends.

It is contemplated that the method further includes determining a remaining time required for the user to reach the destination from a current position upon detecting a request for contents change while outputting the first of the contents and outputting a second of the contents having a reproduction time corresponding to the remaining time. It is further contemplated that the method further includes determining an additional time for the user to reach the destination from a current position if the user does not reach the destination within the estimated time and outputting a second of the contents having a reproduction time corresponding to the additional time.

It is contemplated that the method further includes stopping the outputting of the first of the contents if the user reaches the destination in less than the estimated required time. It is further contemplated that the method further includes outputting the first of the contents at a later time from a position where outputting the first of the contents was stopped.

It is contemplated that the first of the contents is output in a PIP (Picture-In-Picture) format or in a divided screen format. It is further contemplated that at least a portion of the travel guide information is output either audibly or tactilely.

It is contemplated that the method further includes displaying a list of contents related to the first of the contents when the portable terminal is re-connected to the network after completion of outputting the first of the contents. It is further contemplated that the method further includes dividing the entire travel route into a plurality of sections, determining an estimated time for the user to travel each of the plurality of sections and outputting network contents for each of the plurality of sections, the contents for each of the plurality of sections having a reproduction time corresponding to the estimated time for that section.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 5a and 5b are flow charts illustrating a process of providing network contents using a portable terminal according to the present invention.

FIG. 11 illustrates a list of broadcasting programs provided according to the present invention.

FIG. 12 illustrates a list of music contents provided according to the present invention.

DETAILED DESCRIPTION OF THE PREFERRED EMBODIMENTS

The mobile terminal disclosed with respect to the present invention may be a mobile phone, a smart phone, a notebook computer, a digital broadcasting terminal, a PDA (Personal Digital Assistance), a PMP (Portable Multimedia Player) or a GPS navigation device. Reference will now be made to various implementations, examples of which are illustrated in the accompanying drawings.

Figure 1:
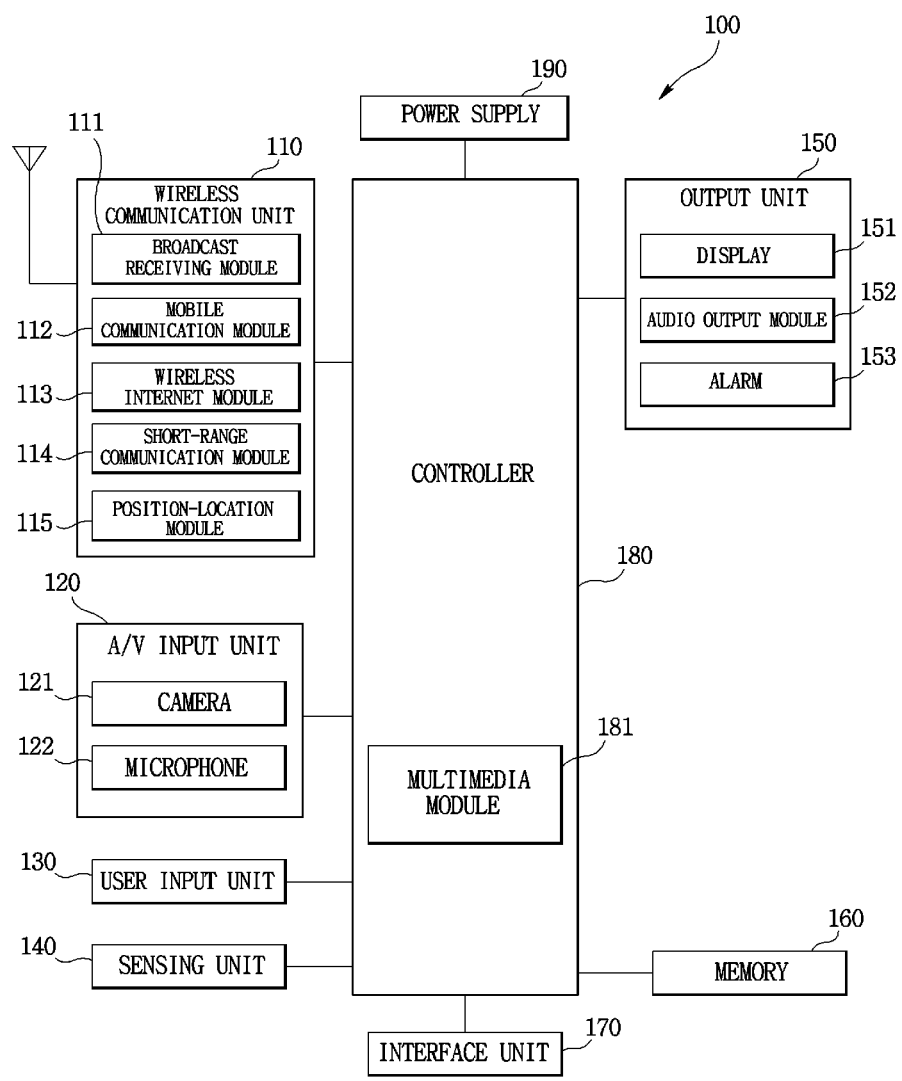
FIG. 1 illustrates a block diagram of a terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system that transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video.

The microphone 122 receives an external audio signal while the mobile terminal 100 is in a particular mode, such as phone call mode, recording mode and voice recognition. This audio signal is processed and converted into digital data. The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones and/or cameras may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 may be implemented to couple the mobile terminal 100 with external devices. Typical external devices include wired/wireless headphones, external chargers, power suppliers, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images that are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The memory 160 may store map data for searching and guiding the travel route of the mobile terminal 100 if the mobile terminal is mounted in a mobile object. The mobile object may not only be mobile means, such as a passenger car, subway or bicycle that can be mounted with the mobile terminal 100 or into which a user holding the mobile terminal may be located, but also may be a user when the user holds the mobile terminal and moves.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The controller 180 may process the navigational information received from the position-location module 115 to determine a current position of the mobile terminal 100 and utilize the map data stored in the memory 160 to search for a travel route from a start point to a destination. The controller 180 may control the display by matching the determined current position of the mobile object to the map data and guide the mobile object along the searched travel route. The controller 180 may display icons for the map, the current position of the mobile object, the travel route and various facilities on the map using the display 151.

The controller 180 may also process network contents provided from external network contents providing servers (not shown), traffic information providing servers (not shown), broadcasting management servers (not shown) and mobile communication service providing servers (not shown) as well as traffic information received via the radio communication unit 110 and output to the output unit 150. The controller 180 may also sequentially display real-time news bulletins or traffic information provided from the external servers (not shown) by a sliding method in text format from right to left at a lower end of the display 151.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
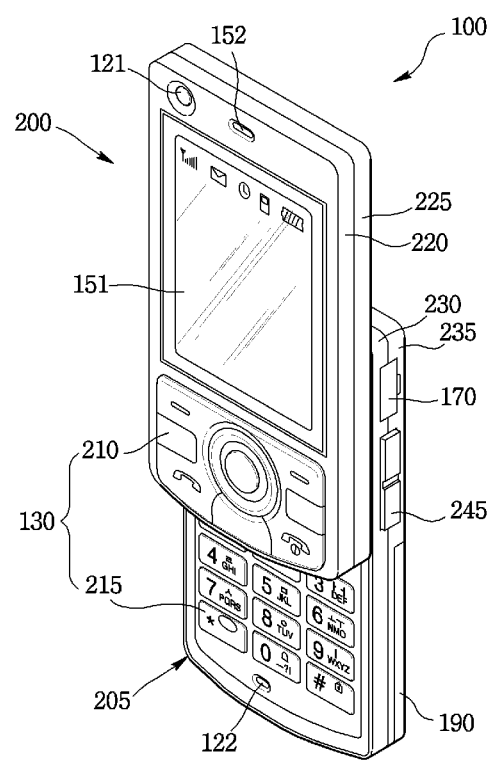
FIG. 2 illustrates a perspective view of a front side of a terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The user input unit 130 may be implemented using one or more dome switches or touch pads that can receive a user command or information according to a press or touch operation by the user. The user input unit 130 may also be implemented using a mechanical manipulation means, such as a rotatable element, such as a wheel, dial, jog button, or thumbwheel, or a linear element, such as a joystick, lever, or knob.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The front case 220 and second case 225 of the first body 200 and the first case 230 and second case 235 or the second body 205 are usually formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit, positioned along the side of the second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
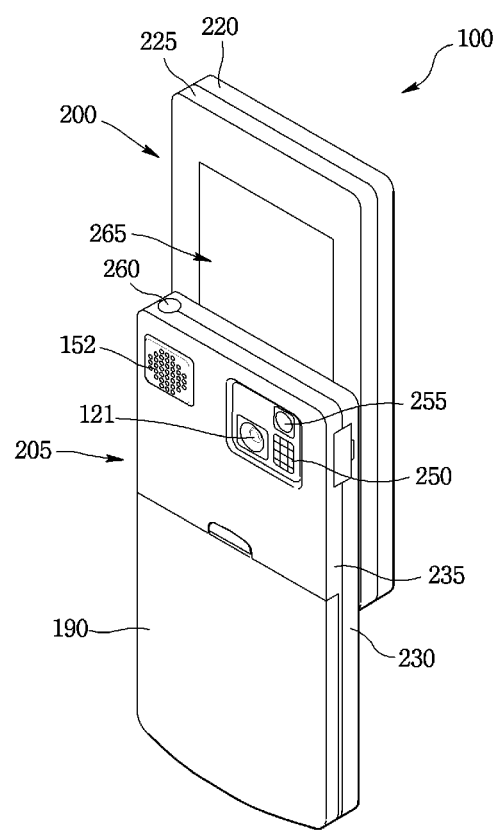
FIG. 3 illustrates a rear view of the terminal illustrated in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a videoconference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations that differ from those shown in FIGS. 2 and 3.

Figure 4:
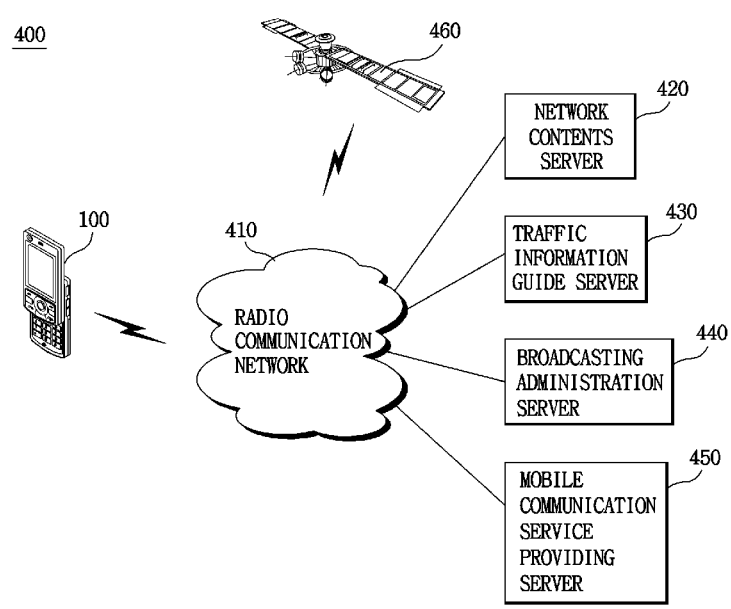
FIG. 4 illustrates a network configuration for providing network contents according to the present invention.

FIG. 4 illustrates a network configuration for providing network contents according to the present invention. As illustrated in FIG. 4, a network 400 for providing network contents using a mobile terminal 100 may include a network contents providing server 420, a traffic information guide server 430, a broadcasting administration server 440, a mobile communication service providing server 450 and a GPS satellite 460, all of which are connected to the mobile terminal via the radio communication network 410.

The radio communication network 410 includes all the networks wirelessly connected to the mobile terminal 100 that can provide voice, image, broadcast signals, navigational information and various multimedia. The radio communication network 410 may include a radio Internet network, a mobile communication network, a broadcasting communication network and a satellite communication network.

The network contents server 420 provides network streaming contents to the mobile terminal 100 via the radio communication network 410. The network streaming contents include voice, image, broadcast signals, position information or various multimedia that can be provided to the mobile terminal 100 via the radio communication network 410.

The streaming contents are provided by a method in which previously received data is preferentially reproduced when a next predetermined amount of data is received even before one contents file is completely transmitted to the mobile terminal 100 while a predetermined amount of data received from the contents file is stored in the memory 160. There is an advantage in the streaming method in that a variety of network contents can be provided to the user with little influence by the capacity of the memory 160, as opposed to a download method that reproduces after download of entire files. There is another advantage in that reproduction time of the contents file can be shortened to provide a user with reproduced of the contents in real time, as opposed to the download method.

The traffic information guide server 430 provides traffic information relative to the current traffic situation and road situation in real time to the user of the mobile terminal 100 via the radio communication network 410. The traffic information includes all the text information, voice information and image information that may affect the user due to traffic gridlock, traffic accident or road repair while the user moves along the traffic route.

The broadcasting administration server 440 generates a broadcasting signal and/or broadcasting related information, or receives the generated broadcasting signal and/or broadcasting related information. The broadcasting administration server 440 transmits the signal and/or information to the mobile terminal 100 via the radio communication network 410.

The radio communication service providing server 450 provides a voice call signal, a video communication call signal or text/multimedia message to the mobile terminal 100 via the mobile communication network. The GPS satellite 460 provides the navigational information to the position-location module 115 of the mobile terminal 100 via the radio communication network 410.

Figure 5B:
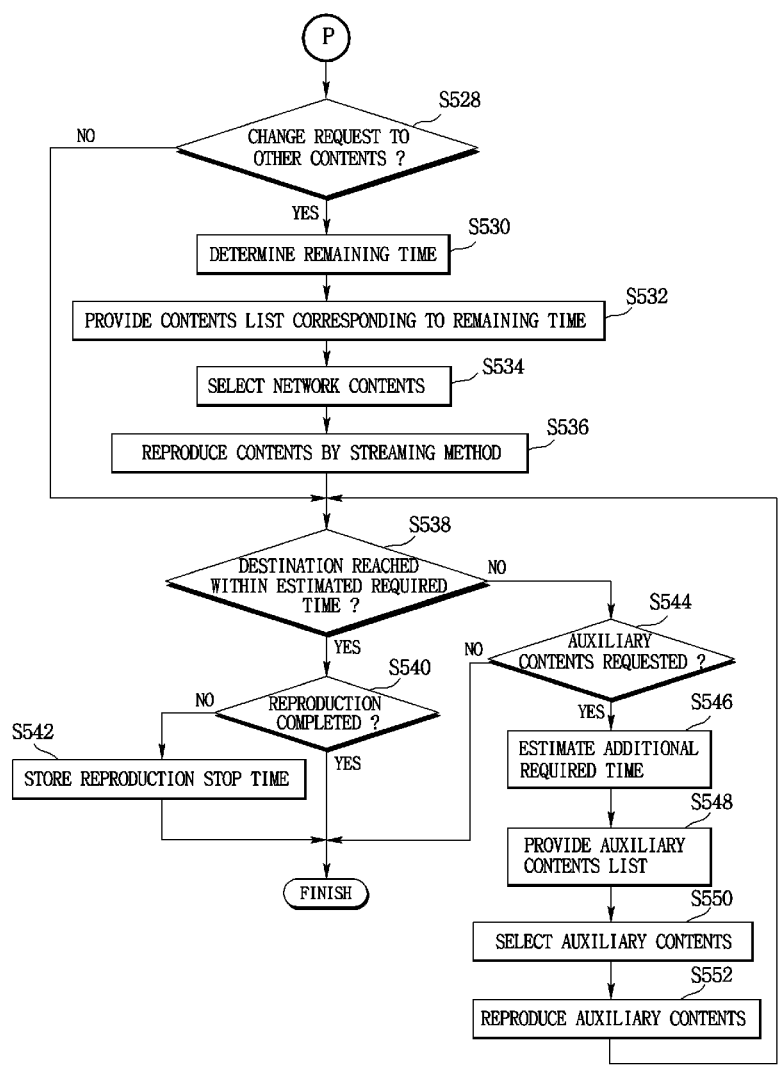

FIGS. 5a and 5b illustrate a method of providing network contents using the portable terminal according to the present invention. As illustrated in FIG. 5a, when the power of the mobile terminal 100 is turned on (S500), the controller 180 uses the navigational information received by the position-location module 115 to determine the current position of the mobile terminal (S502). If the mobile terminal 100 is part of a car navigation system mounted on a mobile object, the controller 180 may detect an accurate position of the mobile terminal by a hybrid method using the navigational information received by the position-location module 115 and a travel status detection signal of the mobile object detected by the sensing unit 140.

The position-location module 115 receives at lease four pieces of navigational information transmitted by a plurality of GPS satellites 460 and uses the received navigational information to calculate a DOP (Dilution of Precision) value indicating the reliability of the received navigational information. The DOP value is low if the navigational information is reliable in a current position of the mobile terminal 100 and is high if the navigational information is unreliable.

The controller 180 compares the DOP value from the position-location module 115 to a preset critical value to determine the reliability of the navigational information. If the comparison indicates that the navigational information is reliable, the current position of the mobile terminal 100 is detected from the navigational information. If the comparison indicates that the navigational information is not reliable, the navigational information is used relative to the last position of the mobile terminal 100 detected by the navigational information that was reliable in order to detect the current position of the mobile terminal.

The controller 180 reads map data of a predetermined area from the memory 160 relative to the determined current position of the mobile terminal 100 when the current position of the mobile terminal is determined.

The controller 180 outputs the read map data to the display 151 of the output unit 150 for display on a screen and the determined current position of the mobile terminal 100 is matched to the map data in order to display the current position on the map (S504). It is preferable that the map is displayed such that the position of the mobile terminal 100 is centrally positioned on the screen.

The controller 180 guides an entire travel route from the current position to the intended destination on the map displayed on the screen and moves along the travel route when the user inputs information relative to an intended destination using the user input unit 130 (S506). The controller 180 visually displays selectable mobile objects on the display 151 as the mobile object travels along the travel route, measures an estimated required time of each mobile object and visually displays the time on the display when corresponding mobile objects are utilized (S508).

Figure 6:
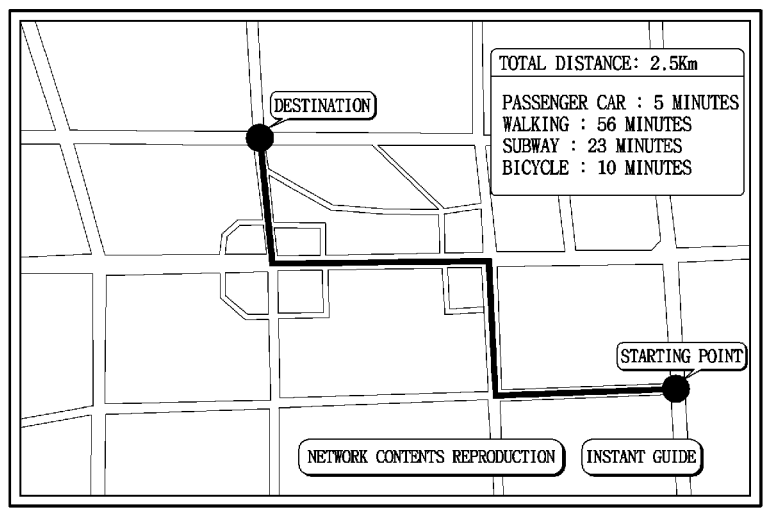
FIG. 6 illustrates a screen of a portable terminal on which an entire travel route is shown.

As illustrated in FIG. 6, when a user inputs destination information such as building name, company name, address or telephone number, the controller 180 may designate the current position of the mobile terminal 100 as a start point of the user, designate a point of the destination information input by the user as a destination and display an entire travel route on the map from the start point to the destination. The user may directly use the use input unit 130 to designate the start point on the map.

Additionally, the right uppermost end of the screen displays a total distance between the start point and the destination as well as an estimated required time to the destination according to a mobile object selected by the user such as passenger car, walking, subway or bicycle. The lowermost end of the screen displays a 'NETWORK CONTENTS REPRODUCTION' button for selecting whether the user wishes to receive the network contents reproduction service according to the present invention, and an 'INSTANT GUIDE' button for selecting whether the user wishes to receive a travel guide in response to the travel route.

The positions of the total distance between the start point and the destination, the estimated required time to the destination, the 'NETWORK CONTENTS REPRODUCTION' button and the 'INSTANT GUIDE' button are exemplary. The positions may be changed according to other embodiments and the invention.

The user may use the user input unit 130 to select the 'NETWORK CONTENTS REPRODUCTION' button in order to receive and view the network contents via the radio communication network. On the other hand, the user may select the 'INSTANT GUIDE' button in order to receive the travel guide service instantly instead of viewing the network contents.

Figure 7:
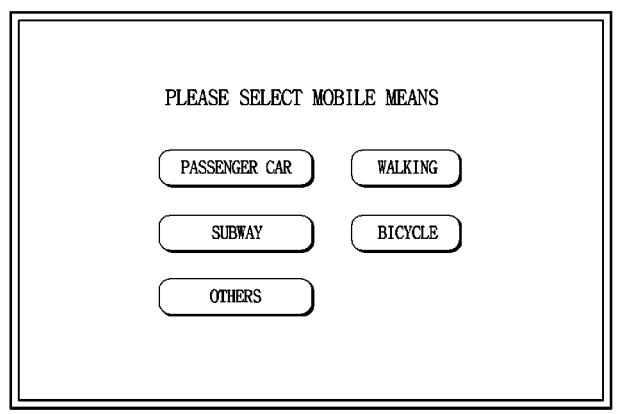
FIG. 7 illustrates a Graphic User Interface (GUI) for selecting mobile means according to the present invention.

A plurality of selection buttons are provided when the user selects the 'NETWORK CONTENTS REPRODUCTION' button on the screen of the display 151, as illustrated in FIG. 7, for selecting a mobile object that will be used by the user to move from the start point to the destination, such as a passenger car, walking, a subway or a bicycle. The user uses the selection buttons to select the mobile object the user intends to use (S510). Although FIG. 7 illustrated a plurality of selection buttons on the display 151, the selection buttons may be replaced with a list menu, a grid icon menu arranged in lattice formats or an icon rotation menu to allow a user to select a mobile object.

The controller 180 uses the wireless communication unit 110 to access the network contents providing server 420 via the radio communication network 410 and to transmit information related to the estimated required time to the network contents providing server when the mobile object is selected by the user. The network contents providing server 420 then provides a list of network contents having a reproduction time corresponding to the estimated required time (S512).

A time required for the user to arrive at the destination is estimated and a list of network contents viewable by the user that correspond to the estimated required time is provided. The contents list provided to a particular user holding the portable terminal 100 may determine the propensity or disposition of the user in advance, whereby a list appropriate to the propensity of the particular user may be provided. The provided contents list may be set up in association with a week-to-week weekly zone basis or a time-to-time zone basis and locational characteristics related to the start point and the destination.

For example, a list related to contents characterized by TV programs for each particular week, a national holiday-to-national holiday zone basis or commemorative day-to-commemorative day zone basis may be provided for classification on a weekly basis. Furthermore, a list on English learning contents during the rush hour zone may be provided or a list on contents distinguished between rush hour time zone and night time zone may be provided for classification on a time-to-time zone basis. Additionally, a list on contents characterized by the start point and the destination input by the user may be provided for classification according to locational zone. For example, a contents list may be provided that indicates information related to weather at the destination input by the user, history or influential persons.

Next, the controller 180 receives the particular network contents according to the streaming method from the network contents server 420 located at a remote location via the wireless communication unit 110 and reproduces the contents using the multimedia module 181 when the user selects particular contents using the user input unit 130 (S516). The controller 180 uses the display (151) and the audio output module 152 to output images and voice.

The controller 180 also outputs the travel guide information for guiding travel of the mobile object along the travel route via the output unit 150 while the network contents are output via the output unit (S516). As a result, the user may receive the guidance on the travel route and simultaneously view the network contents corresponding to the estimated required time while traveling along the travel route. The network contents may be output to the travel route guide screen and to the output unit 150 in response to the designation by the user, as illustrated in FIG. 8.

Figure 8A:
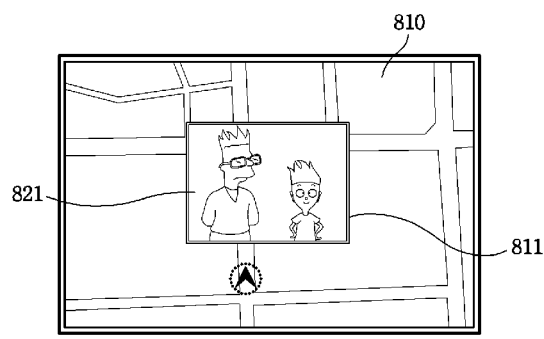
FIGS. 8a, 8b and 8c illustrate a Graphic User Interface (GUI) for selecting network contents according to the present invention.
Figure 8B:
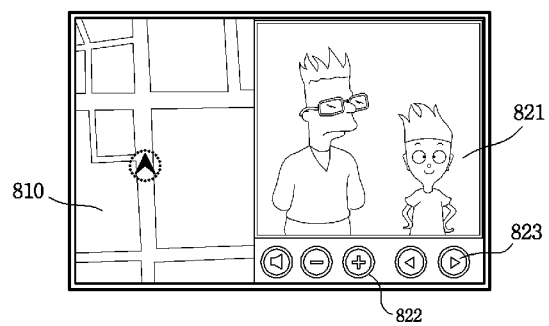
Figure 8C:
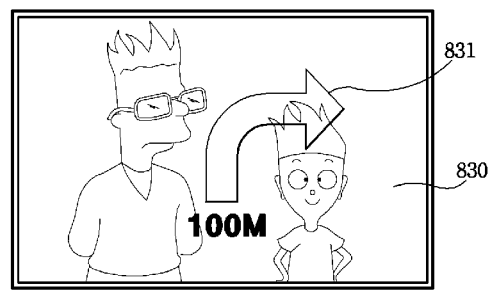

As illustrated in FIG. 8(*a*), a travel route guide image 810 may be displayed as a background screen with a sub-screen 811 displaying an image of the network contents 821 according to a PIP (Picture In Picture) method. Furthermore, as illustrated in FIG. 8(*b*), the screen may be divided into two portions with the travel route guide image 810 displayed on one portion and the image of the network contents 821 displayed on the other portion.

Preferably, the screen for reproduction of network contents is provided with audio control keys for adjusting the audio corresponding to the network contents and functional keys 823 such as channel selection keys, for selecting other contents. As illustrated in FIG. 8(*c*), viewing of the network contents may not be interrupted by displaying a blank image 830 on the background screen and displaying overlapping travel guide information, such as an arrow 831 indicating a left turn or a right turn and indicating a predetermined distance on the blank image or by notifying the user of the travel guide information via sound or vibration.

Figure 9:
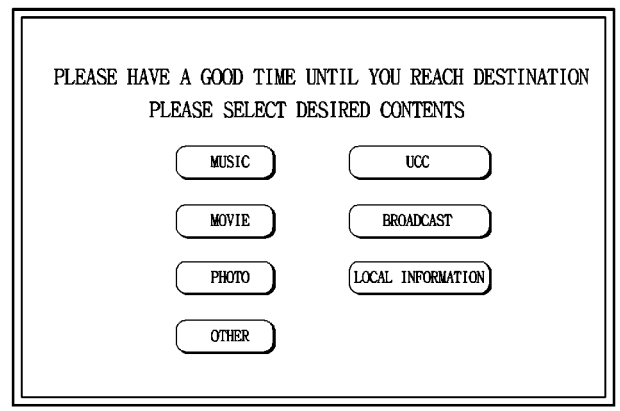
FIG. 9 illustrates a Graphic User Interface (GUI) for simultaneously providing travel guide information and network contents according to the present invention.

FIG. 9 illustrates a Graphic User Interface (GUI) for selecting network contents while providing travel guide information. As illustrated in FIG. 9, a user may select form 'MUSIC', 'MOVIE', 'PHOTO', User Created Contents ('UCC'), 'BROADCAST', 'LOCAL INFORMATION', and 'OTHER' as the network contents.

Figure 10:
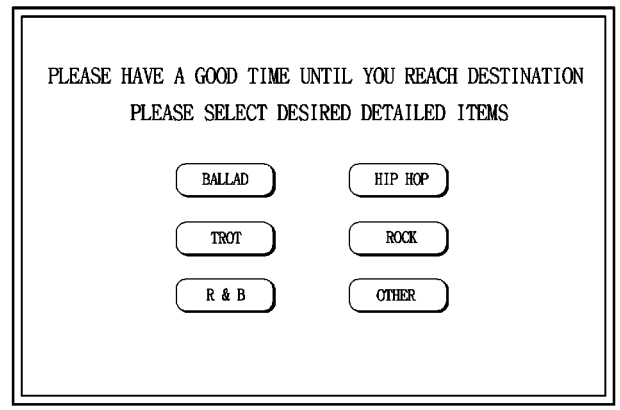
FIG. 10 illustrates a Graphic User Interface (GUI) for selecting music according to the present invention.

For example, when the user selects 'WALKING' as the mobile means from the screen illustrated in FIG. 7 and selects 'MUSIC' as the type of network contents from the screen illustrated in FIG. 9, buttons for selecting the type of music are provided, as illustrated in FIG. 10. As illustrated in FIG. 10, a user may select from 'BALLAD', 'TROT', 'R&B', 'HIP HOP', 'ROCK', and 'OTHER'.

For example, if 'BALLAD' is selected from the screen illustrated in FIG. 10, a list may be provided for the 'BALLAD' music having a reproduction time corresponding to the estimated time required for reaching the destination. The reproduction time corresponding to the estimated required time is a time in which all the reproduction of contents can be completed and is within the estimated required time. In other words, the reproduction time refers to a time in which the reproduction can be completed within a predetermined error tolerance of the estimated required time.

As illustrated in FIG. 11, a list of ballad music list and a time required for reproduction of each of the music contents is displayed on the screen with an indication of an estimated time required for reaching the destination. Therefore, the user may select music that is desired from music indicated on the list, thereby allowing the user to listen to music during travel to the destination that may be completely reproduced before arrival at the destination.

As illustrated in FIG. 12, when the user selects 'WALKING' as the mobile means from the screen illustrated in FIG. 7 and 'BROADCAST' from the screen illustrated in FIG. 9, a list of broadcasting programs is provided that have a reproduction time corresponding to the estimated time required for reaching the destination. Specifically, other contents may be provided at the same time that have a reproduction time corresponding to a difference between the estimated required time for reaching the destination and the reproduction time of the broadcast contents if the reproduction time of broadcast contents is shorter than the estimated time required for reaching the destination.

For example, 'NUMBER 3' in FIG. 12, has a reproduction time related to 'THIRD BROADCASTING CONTENTS' of 30 minutes, which is 26 minutes less than the estimated time of 56 minutes required for arriving at the destination. Therefore, 'MUSIC CONTENTS' having a reproduction time of 25 minutes that is less than the time difference of 26 minutes is provided along with the 'THIRD BROADCASTING CONTENTS' such that the user can enjoy the advantage of continuously viewing the 'THIRD BROADCASTING CONTENTS' and also listening to "MUSIC CONTENTS" while moving to the destination.

The controller 180 then determines whether an event has occurred while the user views the network contents (S518). The event may be a telephone call request, a short message/multimedia message reception or preset alarm function.

If it is determined that a particular event has occurred (S518), the controller 180 inquires whether the user will temporarily stop the reproduction of the network contents (S520) and continuously reproduces the selected network contents while the event is processed if the user decides not to temporarily stop reproduction. Meanwhile, if the user decides to temporarily stop reproduction of the network contents, the controller 180 stops the reproduction of network contents and temporarily stores the remaining network contents that have not been reproduced in the memory 160 (S522).

Figure 13:
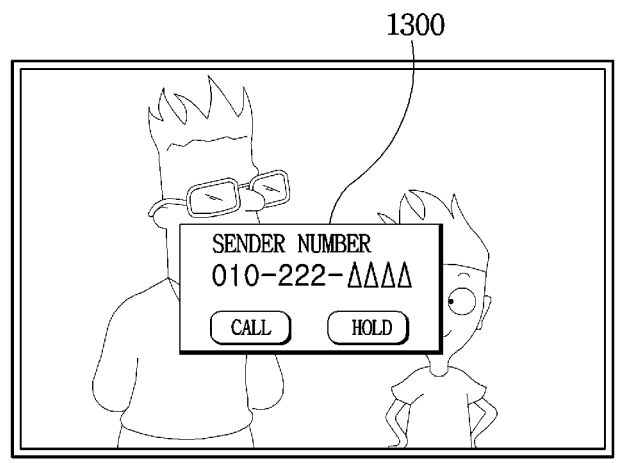
FIG. 13 illustrates a Graphic User Interface (GUI) for indicating the occurrence of an event during reproduction of network contents according to the present invention.

Preferably, a display window 1300 is presented on the display 151 to indicate reception of a message or telephone call, as illustrated in FIG. 13, in order to allow the user to recognize that there was a telephone call request or a message received while the network contents are being reproduced. A 'CALL' button allows a user to view the message or answer the call and a 'HOLD' button allows a user to continuously view the network contents without answering the call or viewing the message.

If the user has decided to temporarily store the remaining contents, the controller 180 determines whether the event has ended (S524). If the event has ended, the controller 180 reproduces the remaining network contents stored in the memory 160 and outputs the contents to the output unit 150 (S526). If the event has not ended, the controller 180 stores the network contents continuously received by the streaming method in the memory 160.

As illustrated in FIG. 5b, after the current reproduction of the network contents has stopped, the user is asked whether reproduction of the other network contents is requested (S528). If the reproduction of other network contents is requested, the controller 180 determines a remaining time for reaching the destination according to the current position of the mobile terminal 100 (S530) and the network contents providing server 420 provides a list of network contents having a reproduction time corresponding to the remaining time (S532).

When the user selects network contents having a reproduction time corresponding to the remaining time using the user input unit 130 (S534), the controller 180 receives the selected network contents from the remotely-located network contents server 420 via the wireless communication unit 110 according to the streaming method and reproduces the contents using the multimedia module 181 (S536). The controller 180 outputs the selected network contents in image and voice using the display 151 and the audio output module 152 (S536).

The controller 180 next determines whether the user has arrived at the destination within the estimated required time along the travel route while the network contents were reproduced (S538). The user may not have arrived at the destination within the estimated required time if the travel time has increased due to, for example, traffic gridlock.

If it is determined that the user has arrived at the destination within the estimated required time, the controller 180 determines whether the selected network contents have been completely reproduced (S540). If the selected network contents have been completely reproduced, the controller 180 ends the process. However, if some portion of the selected network contents have not been reproduced, the controller 180 stops the reproduction of the network contents and stores a time when the reproduction of the network contents has stopped (S542).

Figure 14:
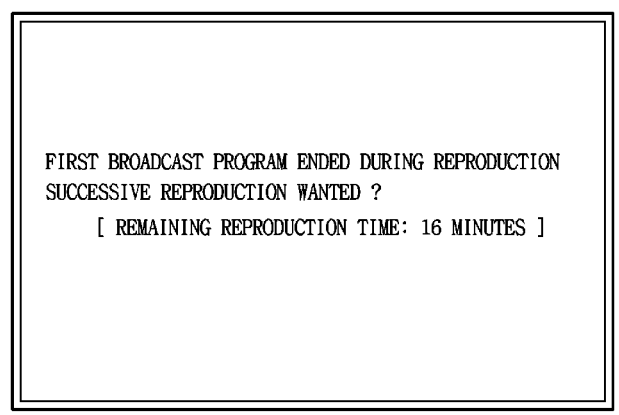
FIG. 14 illustrates a Graphic User Interface (GUI) for inquiring whether to view a portion of network contents that was not reproduced according to the present invention.

The time when the reproduction of network contents was stopped may be stored in the memory 160 inside the mobile terminal 100 or in the network contents providing server 420. If the mobile terminal 100 is turned on at a later time or a network contents service is newly requested, information of the yet-to-be-reproduced network contents and remaining reproduction time are indicated to the user and the user is asked whether to reproduce from the time when the reproduction was stopped, as illustrated in FIG. 14. In this way, the user is allowed to reproduce the remaining contents.

If it is determined that the user has not reached the destination within the estimated required time (S538), the controller 180 asks the user whether to reproduce additional auxiliary contents during a remaining time for the user to arrive at the destination from the current position (S544). If the user does not request to produce additional auxiliary contents via the user input unit 130, the controller 180 ends the process. If the user requests to produce additional auxiliary contents, the controller 180 estimates an 'additional time' required for the user to arrive at the destination from the current position (S546) and displays an auxiliary contents list having a reproduction time corresponding to the additional required time on the display 151.

When the user utilizes the user input unit 130 to select the auxiliary contents (S550), the controller 180 receives the auxiliary contents from the remotely-located network contents server 420 via the wireless communication unit 110 according to the streaming method and reproduces the auxiliary contents using the multimedia module 181 (S552). The controller 180 outputs the auxiliary contents in audio and image formats using the display 151 and the audio output module 152 (S552).

The present invention instantly provides a user with various contents, such as music or movie, from the network contents providing server 420 at a time desired by the user while the user uses the portable terminal 100 to receive a travel guide. Additionally, the information related to network contents reproduced via the mobile terminal 100 is stored in the mobile terminal or the network contents providing server 420, such that contents related to previously reproduced network contents can be provided to the user when the mobile terminal is re-connected to the network contents providing server at a later time.

For example, when a user utilizes the mobile terminal 100 to re-connect to the network contents providing server 420 after viewing one broadcast program, the network contents providing server 420 may provide a sequel to the broadcast program or portion of the broadcast program previously viewed or a list of the latest broadcast programs. This precludes the inconvenience to the user of retrieving all the lists in order to search for a desired broadcast program.

Although exemplary implementations of the present invention have been described with respect to a mobile object used for reaching a destination from a start point, it will be understood that the present invention may be applied when the travel route is divided into a plurality of sections from the start point to the destination and different mobile objects are used to travel along the travel route for each section. This is illustrated in FIG. 15.

Figure 15:
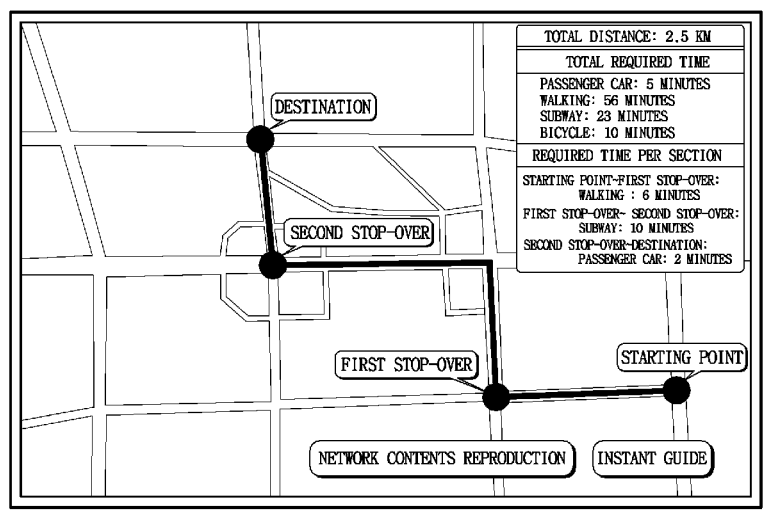
FIG. 15 illustrates a screen of a portable terminal on which an entire travel route is divided into a plurality of sections according to the present invention.

As illustrated in FIG. 15, the controller 180 divides the travel route from the start point to the destination into a plurality of sections and determines an estimated time required for each section according to selected types of mobile objects and a total estimated required time. The mobile object that is selected may be optimally provided for each section under the control of the controller 180 or the mobile object may be selected by the user via the user input unit 130.

As further illustrated in FIG. 15, a distance from a 'STARTING POINT' to a 'first stop-over' is traveled on foot, a distance between the 'first stop-over' and a 'second stop-over' is traveled by subway, and a distance between the 'second stop-over' and the 'destination' is traveled by a passenger car. The controller 180 may determine an estimated time required for each section, receive network contents from the network contents providing server 420 that have a reproduction time corresponding to the total estimated time required for completion of the total travel route and reproduce the contents, and output the contents to the output unit 150. Additionally, the controller 180 may receive a plurality of network contents from the network contents providing server 420 that have a reproduction time corresponding to the estimated time required for each section, receive respective network contents having a reproduction time corresponding to each section, reproduce the contents, and output the contents to the output unit (150).

While the user moves on foot from the 'starting point' to the 'first stop-over', network contents having a reproduction time corresponding to the estimated time required for moving from the 'starting point' to the 'first stop-over' are reproduced. While the user moves by subway from the 'first stop-over' to the 'second stop-over', network contents having a reproduction time corresponding to the estimated time required for moving from the 'first stop-over' to the 'second stop-over' are reproduced. While the user moves by passenger car from the 'second stop-over' to the 'destination', network contents having a reproduction time corresponding to the estimated time required for moving from the 'second stop-over' to the 'destination' are reproduced.

It is to be understood that the above-described mobile terminal equipped with network contents reproduction capability according to the present invention is not limited to the configurations and methods of the exemplary implementations, but may be configured by selectively combining the whole or part of each exemplary implementation, such that variations may be made to the implementations without departing from the spirit of the novel concept as claimed. The above-described implementations illustrate the scope of the invention but do not restrict the scope.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A portable terminal for reproducing multimedia contents, the terminal comprising:
   a wireless communication unit configured for receiving the multimedia contents from a network; and
   a controller configured for:
      processing information related to a destination input by a user and pre-stored map data to search for a travel route from a start point to the destination;
      dividing the travel route into a plurality of sections, wherein a mode of transportation for at least one section of the plurality of sections is different from a mode of transportation for at least one other section of the plurality of sections;
      determining an estimated time for the user to travel each of the plurality of sections based on the mode of transportation for each of the plurality of sections;
      controlling an output unit to output travel guide information for guiding the user along the travel route while outputting corresponding multimedia contents of first multimedia contents of the received multimedia contents for each of the plurality of sections, each of the corresponding multimedia contents having a reproduction time corresponding to the estimated time for each of the plurality of sections;
      determining a remaining time for the user to reach an end of a current section of the plurality of sections from a current position upon a request for contents change while the corresponding multimedia contents of the first multimedia contents that correspond to the current section is output; and controlling the output unit to output second multimedia contents of the received multimedia contents having a reproduction time corresponding to the remaining time.

2. The portable terminal of claim 1, wherein:
the output unit comprises a display configured for visually displaying information, and
the controller is further configured for controlling the display to display a menu for selecting the first multimedia contents for output.

3. The portable terminal of claim 2, wherein the controller is further configured for controlling the display to display the output first multimedia contents in a Picture-in-Picture (PIP) format or by using a divided screen while the travel guide information is being output.

4. The portable terminal of claim 2, wherein the controller is further configured for controlling the display to display a list of contents related to the first multimedia contents after completion of outputting the corresponding multimedia contents of the first multimedia contents.

5. The portable terminal of claim 1, wherein the controller is further configured for:
controlling a memory of the portable terminal to temporarily store a portion of the first multimedia contents upon the occurrence of a predetermined event while the first multimedia contents are being output; and
controlling the output unit to output the stored portion after the predetermined event ends.

6. The portable terminal of claim 1, wherein the controller is further configured for:
determining an additional time for the user to reach the end of the current section of the plurality of sections from the current position when the user does not reach the end of the current section within the estimated time; and
controlling the output unit to output third multimedia contents of the received multimedia contents having a reproduction time corresponding to the additional time.

7. The portable terminal of claim 1, wherein the controller is further configured for controlling the output unit to cease output of the corresponding multimedia contents of the first multimedia contents for the current section of the plurality of sections when the user reaches the end of the current section in less than the estimated time.

8. The portable terminal of claim 7, wherein the controller is further configured for controlling the output unit to output the corresponding multimedia contents of the first multimedia contents at a later time from a position where outputting the corresponding multimedia contents of the first multimedia contents was ceased.

9. The portable terminal of claim 1, wherein the controller is further configured for controlling the output unit to output at least a portion of the travel guide information using either sound or vibration while the corresponding multimedia contents of the first multimedia contents are being output.

10. A method for providing network contents using a portable terminal, the method comprising:
receiving information related to a destination via a user input unit of the portable terminal;
using map data pre-stored in a memory of the portable terminal to search for a travel route from a start point to the destination via a controller of the portable terminal;
dividing the travel route, via the controller, into a plurality of sections, wherein a mode of transportation for at least one section of the plurality of sections is different from a mode of transportation for at least one other section of the plurality of sections;
determining an estimated time, via the controller, for a user to travel each of the plurality of sections based on the mode of transportation for each of the plurality of sections;
receiving contents from a network via a wireless communication unit of the portable terminal;
controlling an output unit of the portable terminal, via the controller, to output travel guide information for guiding a user along the travel route while outputting corresponding multimedia contents of first multimedia contents of the received contents for each of the plurality of sections, each of the corresponding multimedia contents having a reproduction time corresponding to the estimated time for each of the plurality of sections;
determining, via the controller, a remaining time for the user to reach an end of a current section of the plurality of sections from a current position upon detecting a request for contents change while outputting corresponding multimedia contents of the first multimedia contents that correspond to the current section; and
controlling the output unit, via the controller, to output second multimedia contents of the received contents having a reproduction time corresponding to the remaining time.

11. The method of claim 10, further comprising controlling a display of the output unit, via the controller, to display a menu configured for receiving a selection of the first multimedia contents for output.

12. The method of claim 10, further comprising:
temporarily storing, via the memory, a portion of the first multimedia contents upon the controller detecting a predetermined event while the first multimedia contents is output; and
controlling the output unit, via the controller, to output the stored portion after the predetermined event ends.

13. The method of claim 10, further comprising:
determining, via the controller, an additional time for the user to reach the end of the current section of the plurality of sections from the current position when the user does not reach the end of the current section within the estimated time; and
controlling the output unit, via the controller, to output third multimedia contents of the received multimedia contents having a reproduction time corresponding to the additional time.

14. The method of claim 10, further comprising controlling the output unit, via the controller, to cease outputting of the corresponding multimedia contents of the first multimedia contents for the current section of the plurality of sections when the user reaches the end of the current section in less than the estimated time.

15. The method of claim 14, further comprising controlling the output unit, via the controller, to output the corresponding multimedia contents of the first multimedia contents at a later time from a position where outputting the corresponding multimedia contents of the first multimedia contents was ceased.

16. The method of claim 10, further comprising outputting the first of the multimedia contents in a Picture-In-Picture (PIP) format or in a divided screen format.

17. The method of claim 10, further comprising outputting at least a portion of the travel guide information using either sound or vibration.

18. The method of claim 10, further comprising controlling a display of the output unit, via the controller, to display a list of contents related to the first multimedia contents after completion of outputting the corresponding multimedia contents of the first multimedia contents.

\* \* \* \* \*